Dec. 29, 1925.  
T. F. STACY  
PLASTIC MOLDING PRESS  
Filed April 15, 1925  
1,567,766  
5 Sheets-Sheet 1

Inventor  
T.F.Stacy  
by his Attorneys  
Baldwin Wight

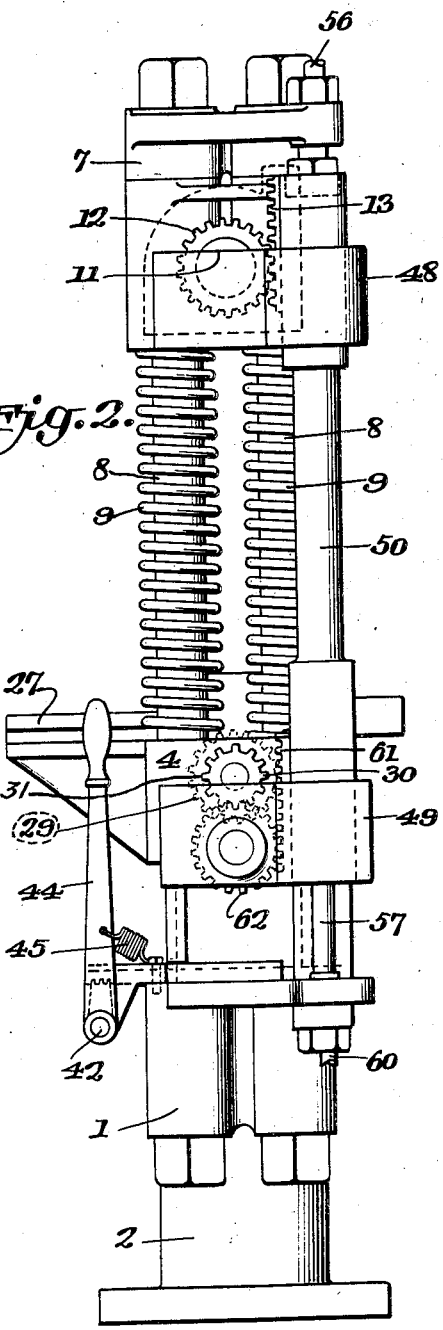
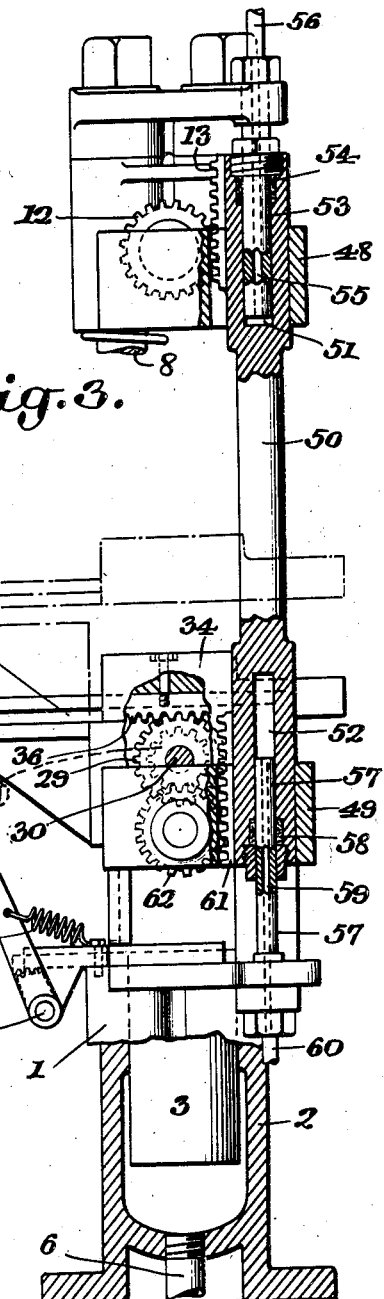

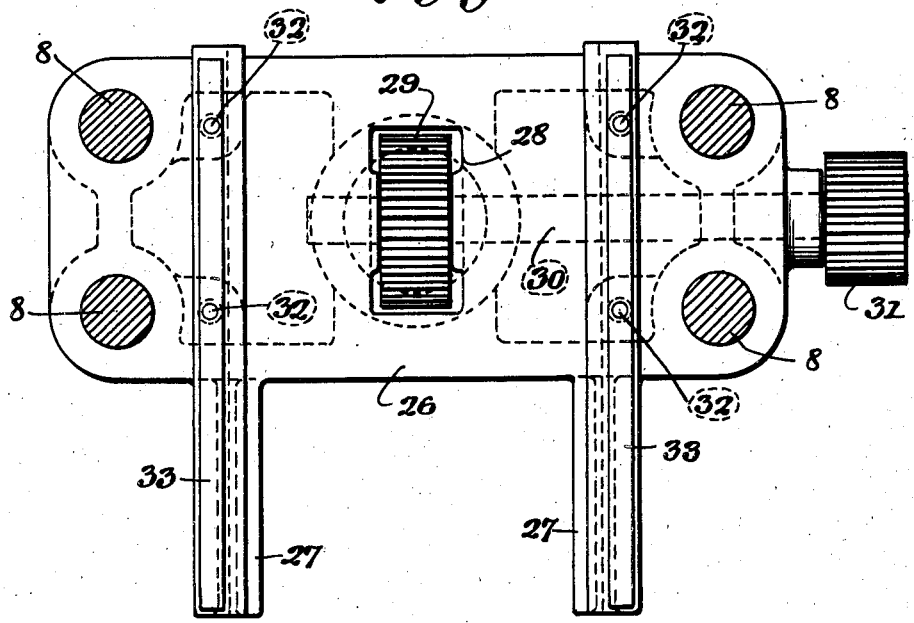
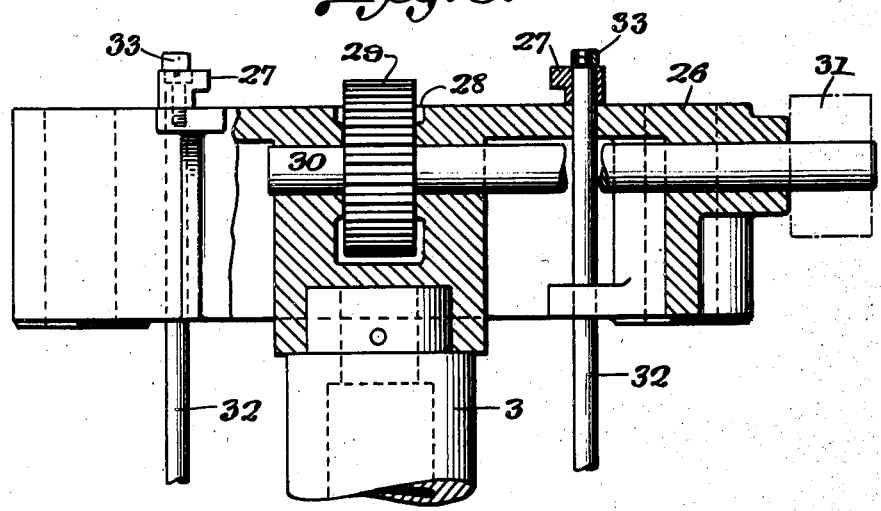

Dec. 29, 1925.
T. F. STACY
PLASTIC MOLDING PRESS
Filed April 15, 1925
1,567,766
5 Sheets-Sheet 5
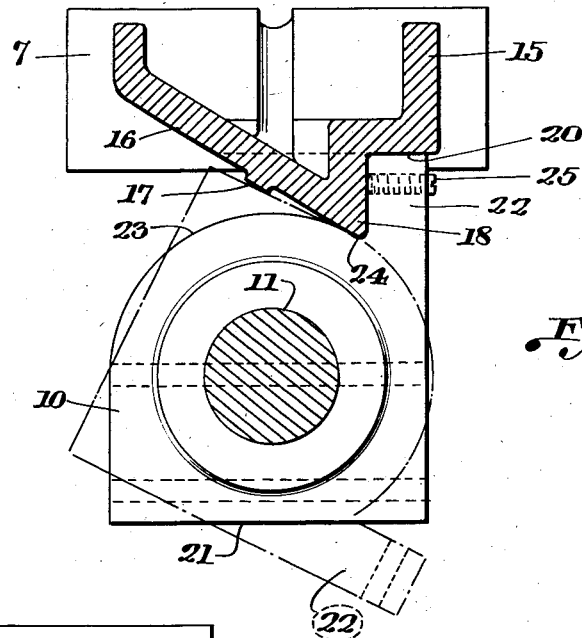
Fig. 8.
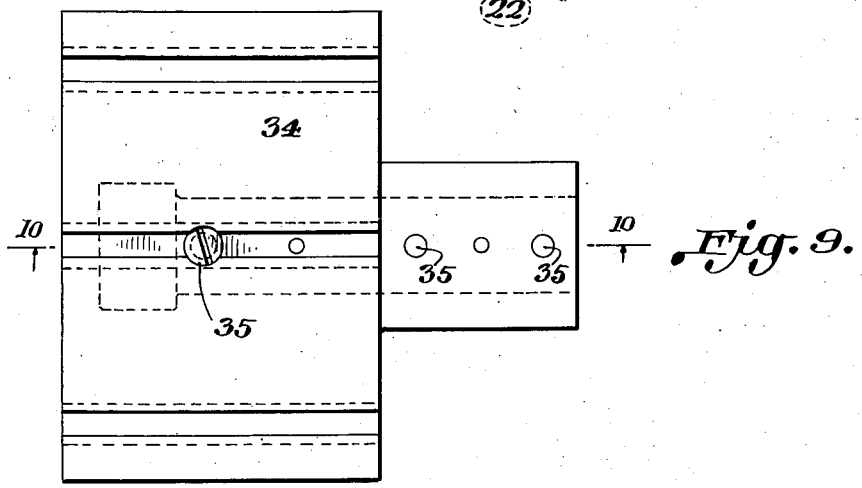
Fig. 9.
Fig. 10.
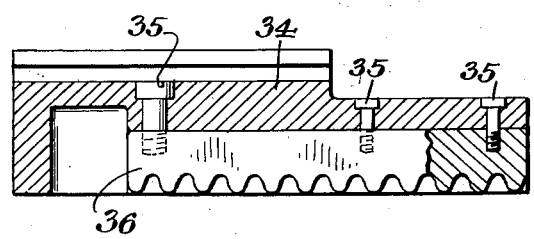
Inventor
T. F. Stacy
by his Attorneys
Baldwin Wight Patented Dec. 29, 1925.

1,567,766

UNITED STATES PATENT OFFICE.

THOMAS F. STACY, OF MOUNT GILEAD, OHIO, ASSIGNOR TO THE HYDRAULIC PRESS MANUFACTURING COMPANY, OF MOUNT GILEAD, OHIO.

PLASTIC-MOLDING PRESS.

Application filed April 15, 1925. Serial No. 23,263.

*To all whom it may concern:*

Be it known that I, THOMAS F. STACY, a citizen of the United States, and resident of Mount Gilead, in the county of Morrow and State of Ohio, have invented certain new and useful Improvements in Plastic-Molding Presses, of which the following is a specification.

The invention relates to a plastic molding press which is similar in some respects to that disclosed in the application of F. E. Stevenson and T. F. Stacy, 739,303, filed September 23, 1924, but is intended to simplify and improve the construction of the machine disclosed in said prior application.

In the present case the upper platen with its tilting press head does not have any longitudinal movement during the pressing operation, the pressing being performed entirely by the movement upward of the lower mold supporting table. This table is provided with automatic knock-out means and the upper tilting head may also be provided with such means if desired. When the table is in its lowermost position it may be given a movement to the front to bring it into a more accessible position and at the same time the upper press head is given its tilting movement.

Other objects of the invention will be apparent from the following detailed description and the appended claims.

In the drawings:

Figure 2 is a side elevation.

Figure 3 is a vertical section with parts in elevation.

Figure 4 is a horizontal section on the line 4—4 of Figure 1.

Figure 5 is a side elevation of the parts shown in Figure 4 with parts in section.

Figure 8 is a section on the line 8—8 of Figure 1.

Figure 9 is a top plan of the lower table.

Figure 10 is a section on the line 10—10 of Figure 9.

Figure 1:
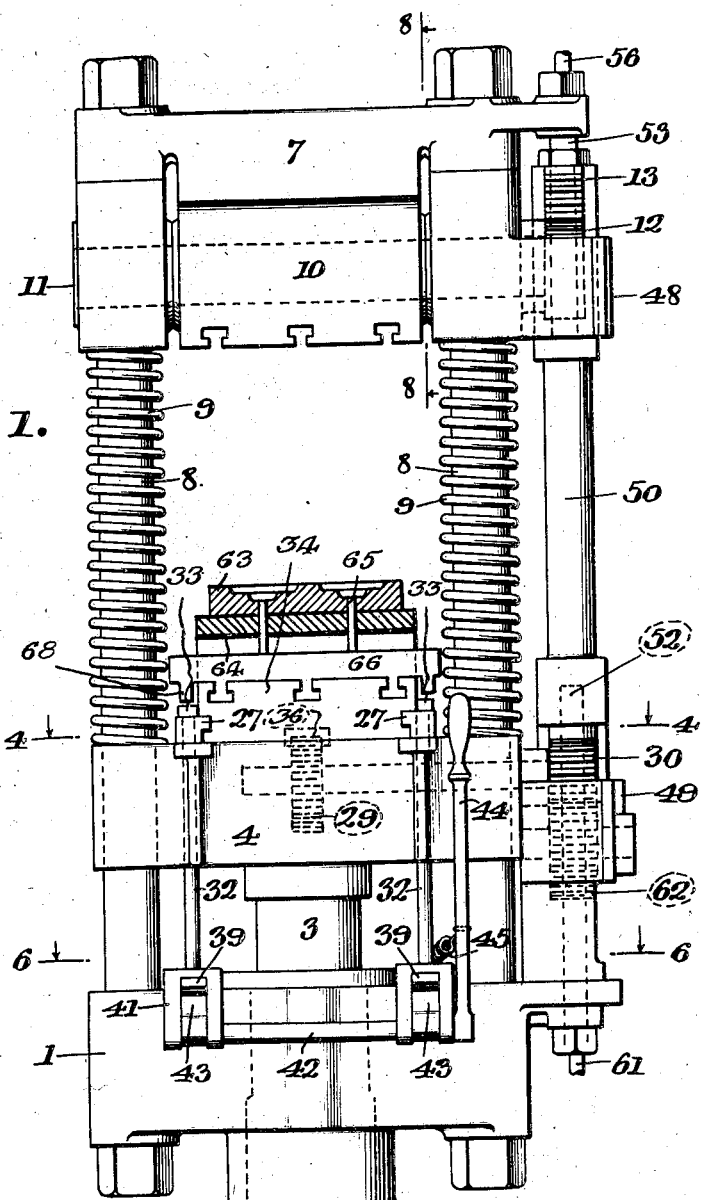
Figure 1 is a front elevation of the press.

The base 1 of the press will be of any suitable size and shape, but comprises a hollow cylinder 2 in which slides a hydraulic plunger 3 the upper end of which supports the movable press member 4. Fluid for exerting pressure upon the plunger 3 will be admitted to and allowed to escape from the cylinder 2 in any desired manner as by means of pipes 5 and 6. The upper frame member 7 of the press is connected to the base 1 by strain rods 8, preferably four in number, on which slides the movable press member 4. A strong spring 9 surrounds each strain rod, bearing at one end against the upper member 7 and at the other end against the movable press member 4, and these springs assist gravity in returning the said press member to its lowest position when hydraulic pressure is relieved from the plunger 3. They also assist in the ejecting operation. Hydraulic cylinders might be used instead of springs.

The upper platen or mold supporting member 10 is rigidly mounted on a shaft 11 mounted at its ends in the frame portion 7 for tilting movement when it is desired to bring the face of this member to more accessible position. One end of this shaft is provided with a pinion 12 which meshes with a rack 13, the pinion being rotated whenever the rack is given longitudinal movement as hereinafter described. As shown in Figure 8, the frame portion 7 has a connecting web member 15 having an inclined portion 16 provided with a stop projection 17 and a right angle portion comprising a vertical face 18 and a horizontal face 20. The tilting mold or head member 10 has a straight face portion 21, an ear 22 extending from the opposite side, and a curved face 23 extending from the ear and comprising a considerable arc of a circle. This curved face is part of a circle drawn from the axis of the shaft 11 as a center with a radius substantially equal to the distance from the axis of this shaft to the lower point 24 of the inclined portion 16. When the tilting head is in the full line or working position of Figure 8, the ear 22 has its vertical face engaging the vertical face 18 of the fixed member 16. Preferably a set screw 25 is carried by this ear and may be adjusted so that the head will stop in precisely the correct position. At the same time the point 24 of the fixed portion 16 fits into the angle between the ear 22 and the curved face 23, and the end of the ear 22 will substantially engage the horizontal face 20 of the fixed portion 16. By making the engaging portions very slightly curved accurate engagement may be obtained. In this manner the tilting head will be firmly supported when in working position and all of the strain will usually fall upon the shaft 11. At the same time, when rotated it will pass from the full line position to the dotted line position of Figure 8, the curved face 23 clearing the lowest point 24 of the web member 15.

The lower movable press member which has been generally designated 4, comprises two main elements. One of these is a table 26 which is connected to or directly engages the upper end of the hydraulic plunger 3. This table slides on the strain rods 8 and is provided with two forwardly extending tracks 27. Mounted in a cut out 28 near the center of the table is a pinion 29 which is carried rigidly by a horizontal shaft 30 which extends to one side of the table and is there provided with a smaller pinion 31. Four knockout rods 32 are supported to slide freely in the table and each pair of rods has affixed to the upper end a narrow strip 33 of substantially the same length as the tracks 27. These knockout rods are operated as hereinafter set forth.

The press member proper 34 shown in plan view in Figure 9, is formed at its edges to engage the guides or tracks 27, so that it may slide backward and forward freely thereon. In the under portion of the member 34, centrally thereof, is attached by means of screws 35 or in any other suitable manner, a rack 36 which meshes with the pinion 29. Whenever this pinion is rotated, the press member 34 will be caused to travel to or fro on the tracks 27 to bring it into more accessible position or into pressing position.

The knockout or ejecting mechanism is operated in the following manner. Supported on the base 1 and guided by suitable rear guides 37 and front guides 38 are two sliding bars 39 each provided at its forward end on its under face with a short toothed portion or rack 40. The front guides 38 are provided with depending ears 41 in which is mounted to rotate a shaft 42 having keyed thereto short arms 43 provided at their free ends with teeth meshing with the racks 40. To one end of the shaft 42 is fast an operating handle 44 normally drawn in one direction by a spring 45. Movement of the handle 44 against the tension of the spring 45 will rock the arms 43 and move the sliding bars 39 toward the front. Beneath the sliding bars 39 the base is provided with four holes 46 which lie outside the hydraulic cylinder 2. Each slide 39 has two holes 47 which register with the holes 46 when the bars are in one of their two limiting positions. When the holes are in register and the press member drops, the rods 32 will pass freely therethrough in their downward movement and there will be no operation of the knockout mechanism. However, in the normal operation as the press member rises, the slide bars 39 will be pulled in by the spring 45 to a position in which the holes 47 are not in register with the holes 46. As the platen descends after the pressing operation the lower ends of the rods 32 will strike on top of the slide bars 39 and thereafter the platen descends independently of the rods 32 and will lift the strips 33 and perform the knockout or ejecting operation. Thereafter an operation of the handle 44 will move the slide bars 39 to a position in which the holes 46 and 47 register and the rods 32 will drop to normal position. Owing to the fact that the strips 33 are substantially the same length as the tracks 27, this knockout operation is not affected by the position of the press member 34 on the tracks 27.

The mechanism by which the upper head is tilted and the lower head is simultaneously moved outward into accessible position will now be described with especial references to Figures 1, 2 and 3. Mounted to slide in bearings 48 and 49 in the upper and lower frame portions is a member 50 having a cylinder 51 at the upper end and a separate cylinder 52 at the lower end. In the cylinder 51 works a stationary ram or piston 53 held in a lug from the upper frame or yoke member, suitable packing 54 being provided. The ram is provided with a central passage 55 opening into the cylinder 51 and a pipe 56 is connected to the outer end thereof for the supply of fluid under pressure. Similarly, in the cylinder 52 works a stationary ram or piston 57 held in a lug from the lower frame member and provided with suitable packing 58. This ram is provided with a central passage 59 opening into the cylinder 52 and a pipe 60 is connected to the outer end thereof for the supply of fluid under pressure. It is obvious that by supplying fluid under pressure to one or the other of the cylinders 51 or 52 that the member 50 may be caused to move longitudinally as desired.

On the outside of the cylinder 51 is the rack 13 which meshes with the pinion 12 on the shaft of the tilting head, so that longitudinal movement of the member 50 and cylinder 51 will tilt the head in one direction or the other. The cylinder 52 has on its outside a rack 61 which meshes with an idler gear 62 mounted in stationary bearings. With this idler gear also meshes, when the movable press member is in its lowest position, the pinion 31 carried by the shaft 30. If therefore, after the movable press member has reached its lowest position, the member 50 is moved downward, the rack 61 will rotate the idler pinion or gear 62 and the rotation will be transmitted through pinion 31, shaft 30, gear 29 and rack 36 to the press member 34 and the latter will be caused to travel on the tracks 27 to forward or more accessible position. Obviously the member 50 will be moved downward by the admission of fluid pressure into the cylinder 51 thus rotating the tilting head and sliding out the table 34, while these parts will be returned to normal operative position by relieving the pressure from cylinder 51 and admitting it to cylinder 52.

Figure 11:
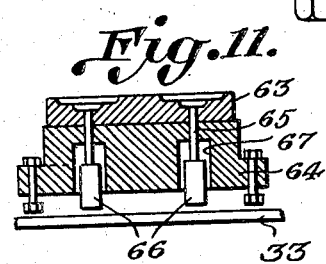
Figure 11 is a section of the mold mechanism taken at right angles to Figure 1.
Figure 6:
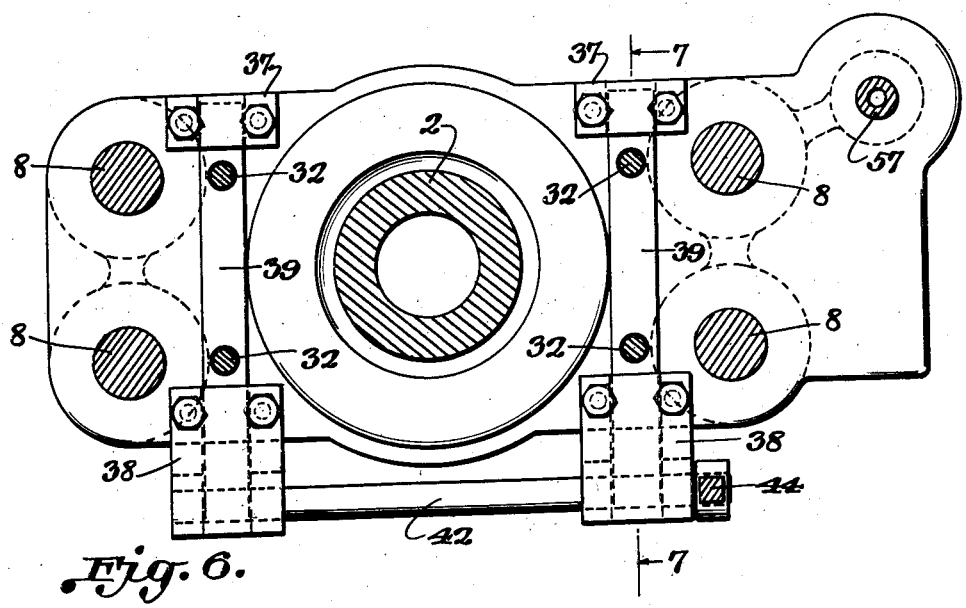
Figure 6 is a cross section on the line 6—6 of Figure 1.
Figure 7:
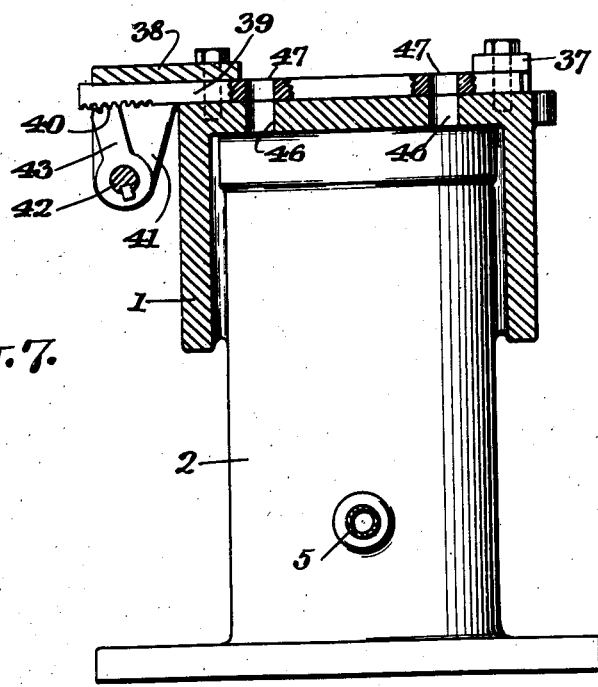
Figure 7 is a section on the line 7—7 of Figure 6.

The ejecting mechanism for the mold proper may be of any old and common type and forms no part of the invention. One form thereof is shown in Figures 1 and 11 wherein the mold 63 is shown as resting upon a grid member 64, both mold and grid being provided with openings through which move hardened steal pins 65. The lower ends of these pins rest upon strips 66, which move in slots 67 of the grid member and have at their ends downwardly projecting portions 68 which rest upon or are slightly out of contact with the strips 33. When the strips 33 are moved as previously described, the strip 66 will also be raised, raising the pin 65 and ejecting the articles from the mold.

It is believed that the operation of the press will be clear from the above description. It is to be understood that the equipment may be driven by manually operated valve mechanism or by automatic motor driven valve mechanism. Also the upper and lower members may be provided with heating and cooling devices as desired, and the upper mold may be provided with ejecting mechanism, such as shown in the above identified application. Various details may be modified without in any way departing from the spirit of the invention, which is to be regarded as limited only by the scope of the appended claims.

I claim as my invention:

1. A molding press comprising an upper stationary member, a tilting head carried by a shaft mounted in said member, a pinion on said shaft, a rack engaging said pinion, a movable cylinder carrying said rack and hydraulic means for moving said cylinder.

2. A molding press comprising an upper stationary member, a tilting head carried thereby, a lower movable pressing member, means for moving said lower member to and from the upper, means for moving the lower member forwardly into more accessible position, means for tilting said head, and means for simultaneously operating said two last-mentioned means.

3. A molding press comprising upper and lower members having relative movement during the pressing operation, a tilting head carried by the upper member, means for tilting said head, a slidable mold carried by the lower member, means for sliding it into different positions, and means for simultaneously operating the tilting and the sliding means.

4. A molding press comprising upper and lower members having relative movement during the pressing operation, a tilting head carried by the upper member, a slidable mold carried by the lower member, and means for simultaneously sliding said mold and tilting said head to bring both to more accessible position.

5. A molding press comprising upper and lower members having relative movement during the pressing operation, a tilting head carried by the upper member, a slidable mold carried by the lower member, and fluid pressure operated means independent of the pressing operation for simultaneously moving both head and mold.

6. A molding press comprising a lower press member movable in the pressing operation, means normally in position for ejecting pressed articles from the press member, means for throwing the ejecting mechanism to inoperative position and means whereby it automatically returns to operative position upon the next pressing movement of the press member.

In testimony whereof, I have hereunto subscribed my name.

THOMAS F. STACY.